United States Patent [19]
Barrow

[11] Patent Number: 5,809,091
[45] Date of Patent: Sep. 15, 1998

[54] TIMING SIGNAL GENERATOR FOR DIGITAL COMMUNICATION SYSTEM

[75] Inventor: David E. Barrow, Durham, N.C.

[73] Assignee: Ericsson, Inc., Research Triangle Park, N.C.

[21] Appl. No.: 659,133

[22] Filed: Jun. 4, 1996

[51] Int. Cl.[6] ........................................... H04J 3/06
[52] U.S. Cl. ..................... 375/354; 375/368; 370/512; 370/514
[58] Field of Search .................. 375/354, 364, 375/368; 370/512, 514

[56] References Cited

U.S. PATENT DOCUMENTS

| | | | |
|---|---|---|---|
| 4,414,676 | 11/1983 | Kraul et al. | 375/368 |
| 4,622,666 | 11/1986 | Graves et al. | 375/368 X |
| 4,835,480 | 5/1989 | Skupen et al. | 342/135 |
| 5,018,140 | 5/1991 | Lee et al. | 375/368 X |
| 5,023,612 | 6/1991 | Liu | 341/94 |
| 5,052,026 | 9/1991 | Walley | 375/373 |
| 5,084,913 | 1/1992 | Kingston et al. | 375/367 |
| 5,282,206 | 1/1994 | Ishihara et al. | 375/368 X |
| 5,293,080 | 3/1994 | Hiwada et al. | 327/141 |
| 5,313,622 | 5/1994 | Truchard et al. | 371/61 |
| 5,400,369 | 3/1995 | Ikemura | 375/368 |
| 5,444,743 | 8/1995 | Scarpa | 375/368 |
| 5,459,754 | 10/1995 | Newby et al. | 375/368 |
| 5,621,773 | 4/1997 | Varma et al. | 375/368 |
| 5,625,654 | 4/1997 | Pinier et al. | 375/365 |
| 5,671,227 | 9/1997 | Keller et al. | 370/509 |

FOREIGN PATENT DOCUMENTS

| | | |
|---|---|---|
| 0 149 136 | 12/1984 | European Pat. Off. . |
| 0 474 138 A2 | 8/1991 | European Pat. Off. . |
| WO 92/11715 | 7/1992 | WIPO . |

OTHER PUBLICATIONS

"Exaktes 'Timing' mit Mikrocontrollern," Andy Keates, May 26, 1989, *Elektronik* No. 11, Munchen, DE, pp. 84–86.

"Single–chip VLSI processor promotes realtime control," Syd Shapiro and Douglas Eidsmore, Computer Design, Nov. 1982, pp. 30–32.

*Primary Examiner*—Young T. Tse
*Attorney, Agent, or Firm*—Rhodes, Coats & Bennett, L.L.P.

[57] ABSTRACT

A timing generator synchronizes a mobile station internal timing with a base station in a TDMA cellular communication system. A random access memory is used to store an event list comprising a series of events which must be executed periodically at precisely timed intervals. Each event in the event list includes an event time and an event code. The events are stored in the random access memory in the order in which they are to occur. The timing generator of the present invention uses a primary counter, a secondary counter, a synchronizing register, a comparator and a signal generator to control the execution of the event in the event list. The primary counter and secondary counter are both clocked at the same rate. The events are read one at a time from the event list into a compare resister. The event time is compared to the value of the secondary counter. When the event time matches the secondary counter value, the event action is passed to the signal generator which decodes and executes the events. The next event is then read into the compared register and the process is repeated until the end of the event list is reached. Once the end of the event list is reached, no further action is taken until the secondary counter is reset, at which time the process is repeated.

38 Claims, 5 Drawing Sheets

TIMING SIGNAL GENERATOR FOR DIGITAL COMMUNICATION SYSTEM

FIELD OF THE INVENTION

The present invention relates, in general, to mobile cellular communication systems and, more specifically, to an apparatus for synchronizing a mobile phone with a base station in a TDMA cellular communication system.

BACKGROUND OF THE INVENTION

The initial and dominant cellular radio communication system, the Advanced Mobile Phone System (AMPS), is quickly running out of bandwidth capacity due to the increasing popularity of cellular phones. The AMPS uses Frequency Division Multiple Access to create 30 kHz communication channels within a 50 Mhz bandwidth carrier (cellular phones operate within the band 844–894 mhz). Each channel supports a single call within a geographic cell and is assigned a unique frequency to prevent interference between adjacent channels. Since the available bandwidth limits the number of available channels, the number of cellular phone users can saturate the system during times of peak load. The continuing growth in demand for cellular phone services is already overloading many cellular systems throughout the country. No one expects that the growing demand for cellular services can be met by allocating additional spectrum. Therefore, the current challenge is to increase caller capacity within the cellular phone bandwidth already allocated.

Digital processing techniques have been developed to efficiently use the available frequency spectrum and to increase capacity. The analog speech waveform is first digitized and then compressed prior to modulation to decrease the data transmission time. These digital techniques allow several voice users to be multiplexed over a single communication channel which increases the cellular system capacity without increasing the bandwidth.

Time Division Multiple Access (TDMA) is a time-based method for sharing communication resources in a digital cellular communications system. In a TDMA system, each communication channel is divided into periodic 40 ms "frames" with each frame subdivided into several equal duration time "slots". Each mobile station is assigned a slot in the frame during which the mobile station transmits and receives information in short bursts. Since there are several slots per frame, a plurality of mobile users can simultaneously use each communication channel. The TDMA scheme has been standardized by the Electronics Industries Association (EIA) and the Telecommunication Industry Association (TIA) as IS-54, which is incorporated herein by reference.

Since the transmitted RF electromagnetic wave experiences propagation delays due to distance, terrain, and interference, the mobile station's transmissions become misaligned relative to the base station frame timing. If the mobile station is to stay synchronized with the frame sent from the base station, the mobile station must, therefore, adjust its internal timing to compensate for this slot misalignment.

Timing generators have been used in the past to provide the adjustable timing required by TDMA mobile stations. In the past, timing generators have used individual registers and comparators to store and execute timing instructions. Each individual timing instruction was stored in a separate register and used a separate comparator to determine when to execute the event. Since each register could only store one event, multiple comparator register pairs were needed to execute a sequence of instructions. Each comparator/register pair required its own logic gates thereby increasing size and power requirements.

There remains a need for a timing generator circuit design that requires less battery power than previous designs, is smaller in size than previous designs, and is more flexible to help meet the public demand for low-cost, digital cellular services.

SUMMARY OF THE INVENTION

The present invention is an improved timing generator for synchronizing a mobile station's internal timing with a base station in a TDMA cellular communication system. A random access memory is used to store an event list comprising a series of events which must be executed periodically at precisely timed intervals. Each event in the event list comprises an event time and an event action code. The events are stored in the random access memory in the order in which they are to occur.

The timing generator of the present invention uses a primary counter, a secondary counter, a synchronizing register, a comparator, and a signal generator to control the execution of the events in the event list. The primary counter and secondary counter are both clocked at the same rate. The events are read one at a time from the event list into a compare register. The event time is compared to the value of a secondary counter. When the event time matches the secondary counter value, the event action is passed to a signal generator which decodes and executes the event. The next event is then read into the compare register and the process is repeated until the end of the event list is reached. Once the end of the event list is reached, no further action code is taken until the secondary counter is reset, at which time the process is repeated.

The synchronizing register controls when the secondary counter is reset. The synchronizing register stores a reset value, which is some valid primary counter value. When the primary counter value matches the reset value, the secondary counter resets.

All of the event times are referenced to the secondary counter. Consequently, timing adjustments can be made by updating the reset value stored in the sync register. The mobile station's microprocessor calculates the offset needed to maintain proper time alignment with the base station and uses the offset to calculate a reset value which is stored in the sync register.

By using a random access memory to store a sequence of events that must be executed periodically, the present invention requires fewer components and utilizes less power than conventional timing generators. The present invention is also more flexible than conventional timing generators which use individual registers to store each event. With the present invention, multiple event lists can be stored in the random access memory and a pointer can be used to change the event list "on the fly".

DETAILED DESCRIPTION OF THE PREFERRED EMBODIMENT

In a TDMA cellular communication system, each communication channel is divided into a series of 40 millisecond frames which are further divided into 6 time slots. Each mobile station is assigned a slot during which the mobile station transmits and receives information in bursts. For the mobile station's transmissions to be received by the base station in the proper time slot, the mobile station must be able to adjust its internal signal timing so that it stays synchronized with the base station.

The present invention is a RAM-based timing generator which provides adjustable timing for a mobile station in a TDMA cellular communication system. The RAM-based timing generator, which is indicated generally by the number 10, generates strobes and signals which are used to control the sequencing of actions required for the mobile station's transmit and receive functions. These actions must be performed periodically and must be synchronized with the base station frame timing.

The timing generator 10 of the present invention uses a random access memory to insure that any required actions for a desired function are properly synchronized with the base station frame timing. A sequence of actions which must be performed periodically is stored in the random access memory as an event list. Each event in the event list specifies the action to be performed (the event action) and gives timing information (the event time) for the specified action. The timing generator 10 executes the events stored in the event list using the timing information provided to insure that the actions are synchronized with the base station frame timing.

Figure 1:
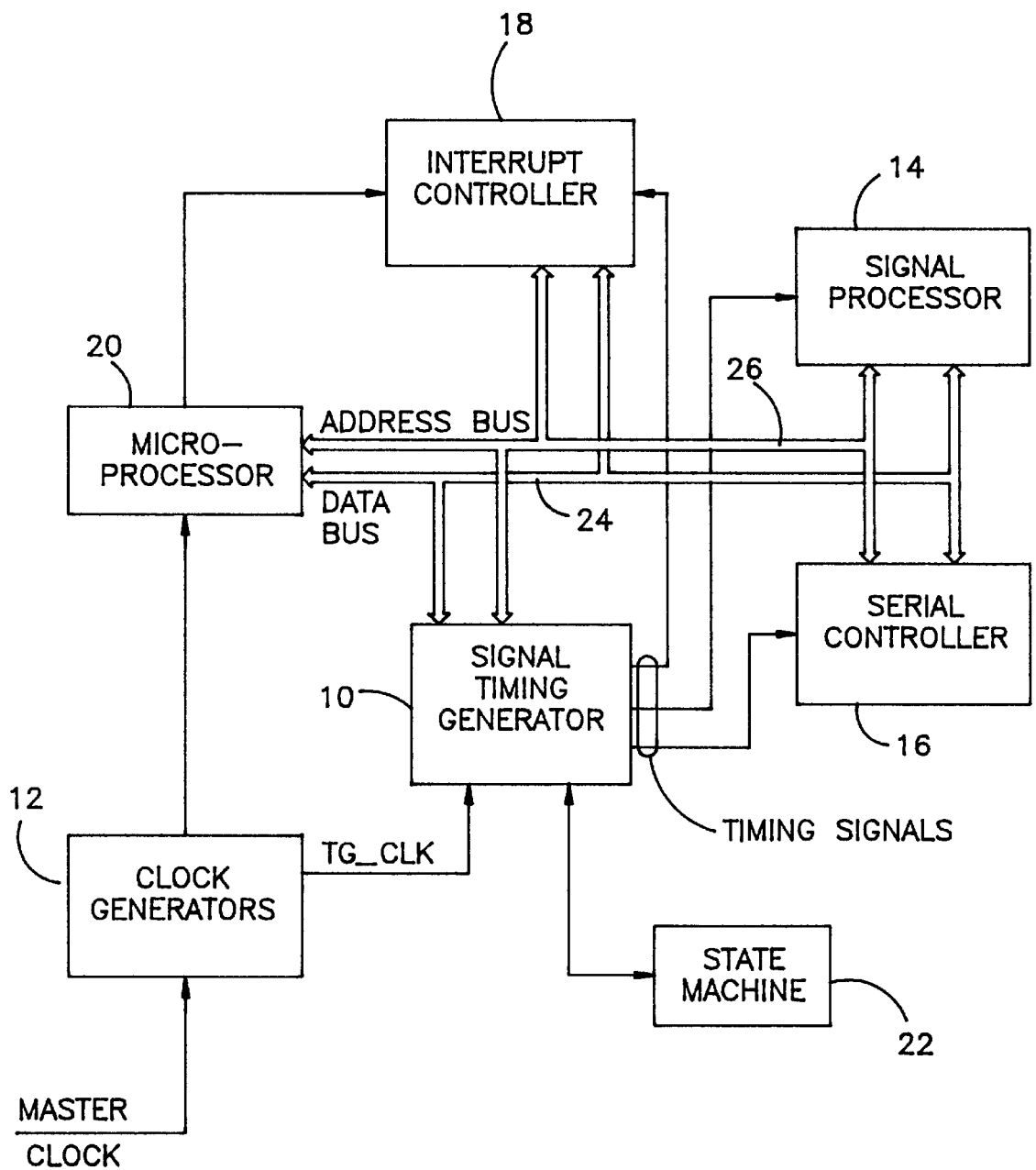
FIG. 1 is a block diagram of the system environment for the timing generator of the present invention.

FIG. 1 is a schematic diagram of the system environment for the timing generator 10. The timing generator 10 receives an external clock signal from a clock generator 12. The timing signals from the timing generator 10 are output to a signal processor 14, a serial controller 16, and an interrupt controller 18. A microprocessor 20 interfaces with the timing generator 10, signal processor 14, serial controller 16, and interrupt controller 18 via data and address busses 24 and 26. A state machine 22 provides the control logic for the timing generator 10.

Figure 2:
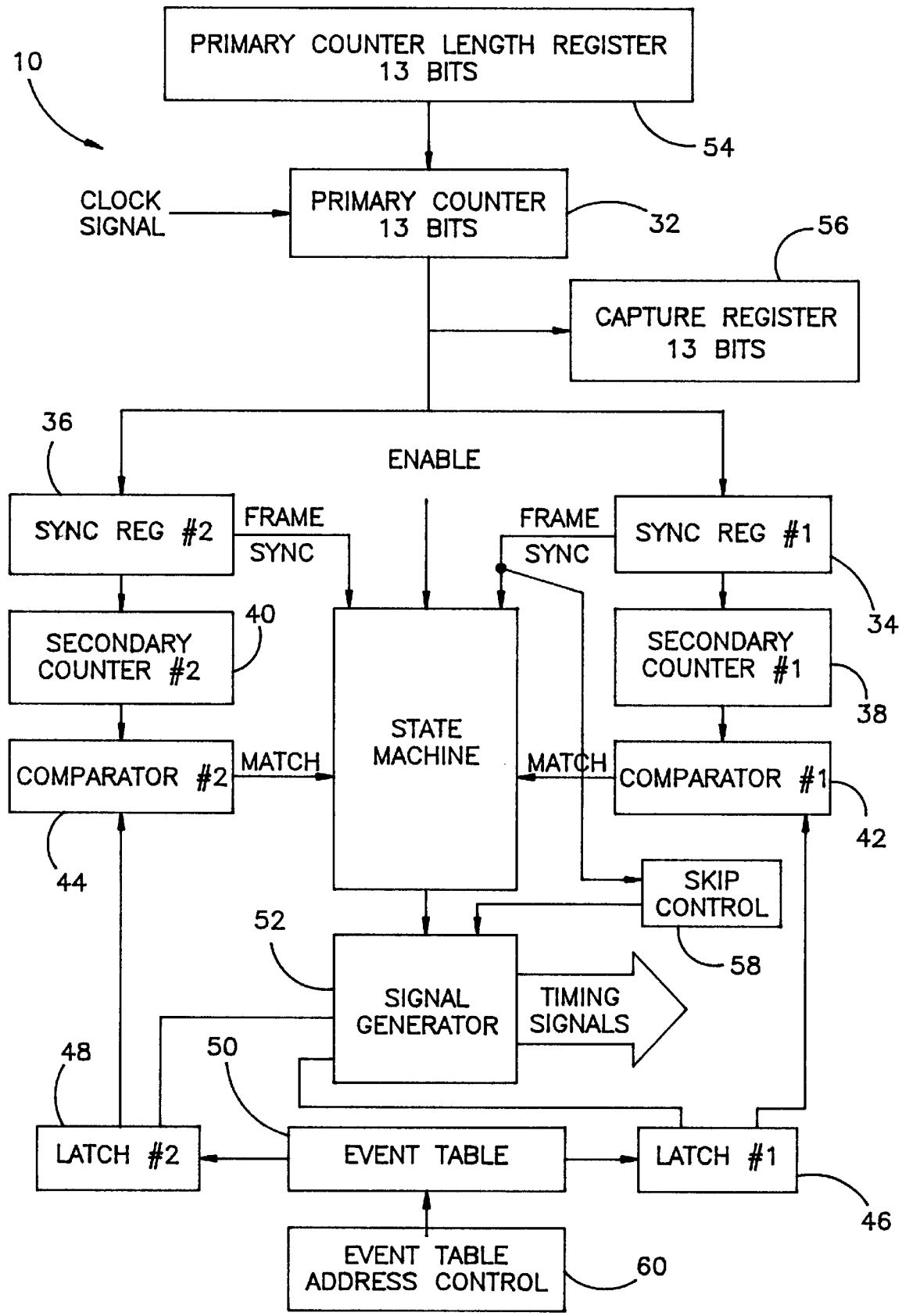
FIG. 2 is a block diagram of the timing generator.

Referring now to FIG. 2, there is shown a block diagram of the timing generator 10. The main components of the timing generator 10 include a primary counter 32, two synchronizing registers 34 and 36, two secondary counters 38 and 40, two comparators 42 and 44, two compare registers 46 and 48, a random access memory 50, a signal generator 52, a primary counter length register 54, a primary counter capture register 56, and a skip control 58.

The primary counter 32 establishes a time base for the timing generator 10. The primary counter 32 is incremented by an external clock TG-CLK which is supplied by the clock generator 12. Preferably, a 194.4 kHz clock signal is used. To provide a 40 ms reference using a 194.4 kHz clock signal, the primary counter 32 is required to have a length of 13 bits.

The primary counter 32 increments at the positive edges of the external clock signal. The primary counter 32 starts at zero and counts up to a programmed terminal frame count which is stored in the primary counter length register 54. Once the primary counter 32 is started, no adjustment can be made except by changing the frame length value of the primary counter length register 54. When the programmed terminal frame count is reached, the primary counter 32 resets to zero and continues counting.

The secondary counters 38 and 40 have the same length and use the same external clock as the primary counter 32. Each secondary counter 38, 40 has an associated sync register 34, 36 which is used to reset the secondary counter 38, 40. The sync registers 34, 36 store a reset value for their corresponding secondary counters 38, 40. The reset value stored in the sync register 34, 36 is referenced to the primary counter 32. The reset value stored in each sync register 34, 36 is updated periodically by the mobile station's microprocessor 20 to make timing adjustments. Each sync register 34, 36 includes means for latching and comparing the primary counter value and comparing it to the reset value stored in the sync register 34, 36. When the primary counter value matches the reset value stored in the sync register 34, 36, the appropriate secondary counter 38, 40 is reset. At this time, a "frame sync" signal is generated to indicate the frame rollover.

The output of the secondary counter 38, 40 is passed to a corresponding comparator 42, 44. The comparators 42, 44 and compare registers 46, 48 are used to compare the secondary counter values with the event times of the events stored in the event RAM.

When the event time of an event matches the secondary counter value, the comparator 42, 44 generates a match signal which is input to the state machine. The state machine generates a pulse to the signal generator 52 which decodes and executes the event as will be described more fully below.

The compare registers 46, 48 are used as a latch to hold each event time while the event time is compared to the value of the secondary counter 38, 40. The compare registers 46, 48 are 19 bits in length. The 13 most significant bits correspond to the event time. The 6 least significant bits correspond to the event action. The 13 bits representing the event time are compared to the secondary counter value. If the secondary counter value matches the 13 bit event time, the 6 bit event action code is passed to the signal generator 52 where it is decoded and executed.

The signal generator 52 is used to generate timing signals that control the transmit, receive, and audio functions of the mobile station. Up to 32 unique timing signals and interrupts may be generated by the signal generator 52 using a 6-bit code. In the disclosed embodiment, the signal generator 52 generates 28 timing signals and 4 interrupt signals. The signal generator 52 includes a decode register to hold the event action code for the next event to be executed.

The primary counter capture register 56 captures and stores the primary counter value on the rising edge of an external trigger. The capture register 56 allows the microprocessor 20 to read the value of the primary counter. The microprocessor 20 uses the primary counter value and timing information provided by the base station to calculate and update the reset value in order to make timing adjustments. The methods for calculating timing adjustments are not discussed herein but are well known to those skilled in the art. One method used in TDMA systems is described in U.S. Pat. No. 5,430,760 which is incorporated herein by reference.

The skip control 58 allows events and sync interrupts to be deactivated for a predetermined number of frames up to 1,024 frames. The skip control also allows activation for up to 64 "frames" before switching back to deactivation mode. The skip control 58 counts the number of "frames" which are marked by the "frame sync" signal from the first secondary counter 38.

As previously indicated, the random access memory 50 is used to store an event list. In the present invention, a 128 word by 19 bit RAM holds all of the events. Each event is represented by 19 bits. The first 13 bits represent the event time and the last 6 bits represent the event action. The event times are absolute times referenced to the secondary counter value. The events are stored in the event list in the order they are to occur. The event list determines what strobes or pulses are generated by the signal generator 52 and when they are generated. The event list is a repeating sequence which restarts at the end of a frame which is marked by a "frame sync" from the first secondary counter 38.

There are 64 valid event actions. The valid event actions include: (1) end of list; (2) disable group; (3) set signal low (one for each control signal); (4) set signal high (one for each control signal); (5) user interrupt 1; (6) user interrupt 2; (7) user interrupt 3; (8) user interrupt 4; and (9) no action.

The "set signal high" and "set signal low" actions are used to set the timing control signals from the signal generator 52. As described above, the signal generator 52 is used to set 28 timing signals that control the transmit and receive functions of the mobile unit. A "set signal high" and "set signal low" code is available for each of the 28 timing signals from the signal generator 52. Thus, it will be apparent that a strobe or pulse requires at least two actions, one to set the signal high and another to set the signal low.

All signal outputs from the signal generator 52 are active high by default. If any signal is desired to be active low, the user must initialize the starting state of the signal of any active low signal to a state of logic high. When programming the events, the user should construct the signals to first go low and then go high.

The "user interrupt" actions are used to signal the microprocessor 20 that certain events or event times have expired so that the microprocessor 20 can take appropriate action. The "no action" event is used as a placeholder in an event list which allows easy addition and deletion of events from the list without changing the order of the remaining events in the list. The "end of list" action is the last event in an event list and is used to indicate when the end of the list is reached.

The "disable group" action is used to disable events in an event list. The disable group action disables the execution of an event list on the next occurrence of a "frame sync" from the corresponding sync register 34, 36. This action, therefore, can be used to execute the event list only once.

Figure 3:
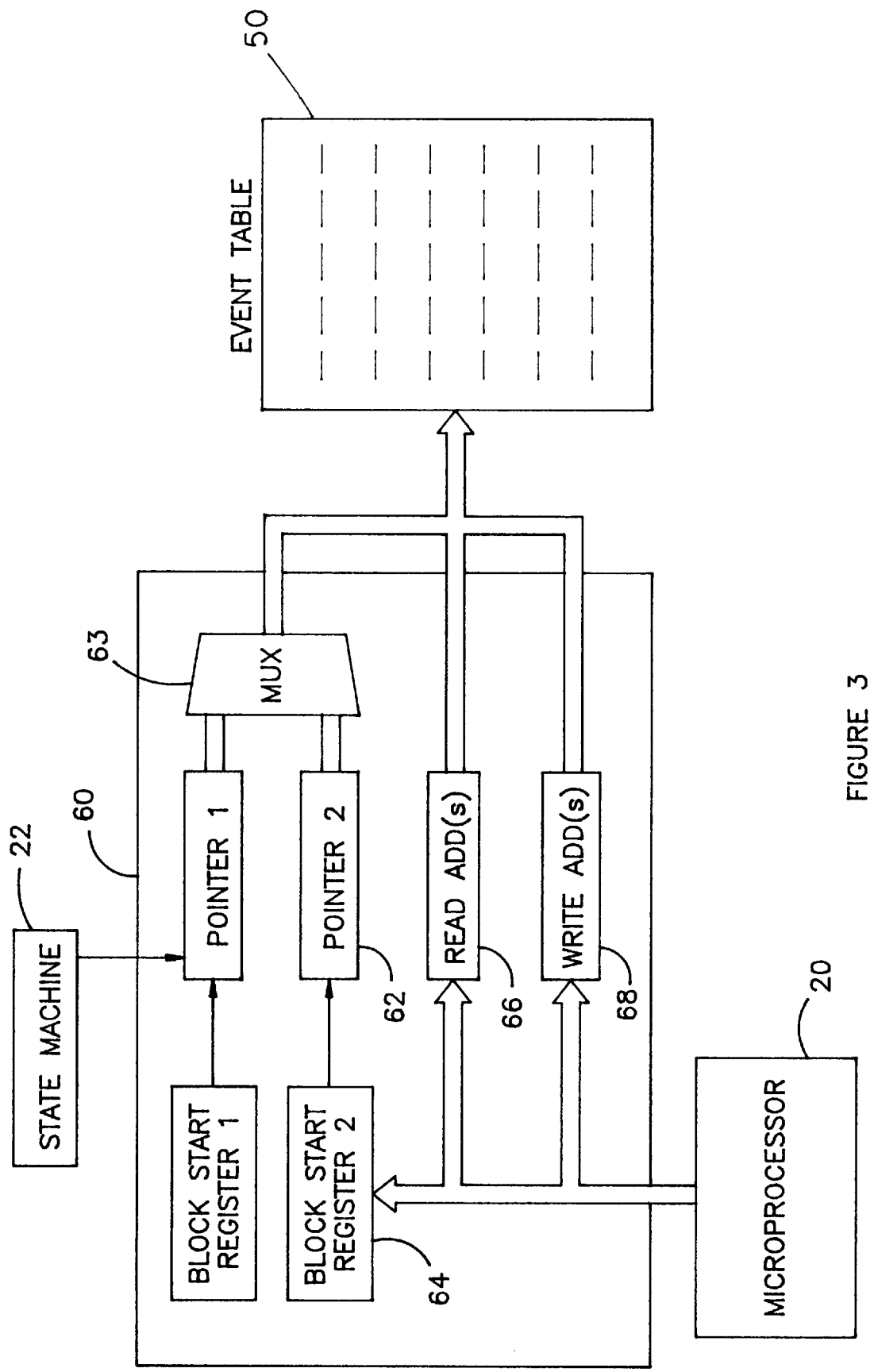
FIG. 3 is a block diagram of the address control for the timing generator.

The event table address control 60, shown in FIG. 3, provides an interface between the microprocessor 20 and the event table 50 where the event list is stored. The event table address control 60 includes two block start registers 64, a read address register 66, a writer address register 68 and two pointers 62. The pointers 62 point to an address in the event table. When a load signal is received from the state machine 22, the content of the block start register 64 is copied into the pointer 62 and then the event present at that address is loaded into the compare register. The block start registers 64 store the beginning address of the event list. When the secondary counter resets, the state machine transitions to the load state 116, 120. During this load state, the beginning address from the block start register is loaded into the pointer 62 for the respective counter. The read address register and write address register 68 provide indirect access to the event table. These addresses are used to "write" event data into the event list and to "read" data back from memory. Since methods for reading and writing to memory are well-known to those of ordinary skill in the art, a detailed explanation of such procedures is omitted.

In general, the event times for each event are set up relative to a frame event, such as the start of the frame or the start of the transmit or receive slot. The reset values of the sync register would then be set to synchronize the secondary counter to the referenced frame event. For example, if an event list comprising all transmit slot events is defined, it would be appropriate to use the beginning of the transmit slot as a time reference for the events. The sync register would then be adjusted to reset the secondary counter at the beginning of the transmit slot.

The event list is an executable program that determines what signals are generated by the signal generator 52 and when they are generated. Each event list must end with the "end of list" command. Once the event list is written, the starting address of the list needs to be written into the block start register. It will be readily apparent that, given sufficient RAM, multiple event lists can be defined for each secondary counter. The microprocessor 20 could switch between event lists by changing the beginning address in the block start register to the beginning of the new list. This action can be programmed to occur either at the next "frame sync" or immediately.

A separate event list may be defined for each secondary counter 38, 40. For example, one event list could be used for all transmit slot events while the other event list could be used for frame receive events. Such allocation would make independent receive and transmit time alignment easy. In this case, the "frame sync" from the sync registers 34, 36 would correspond to the beginning of the transmit and receive slots, respectively, and could be used as slot indicators. After entering the transmit slot, there is sufficient time to update receive events using a low priority interrupt. Similarly, after entering the receive slots, the transmit events could be updated.

Another way to use two secondary counters would be to provide timing for more than one base station. Each secondary counter can be referenced to an independent base station and switched into operation at the appropriate time.

Either secondary counter 38, 40 can use up any number of RAM locations to generate its output program. Since there are two secondary counters, the event RAM resources must be divided between the two secondary counters 38, 40. It is possible for the secondary counters 38, 40 to share RAM locations.

The event list for either secondary counter 38, 40 may be written to the event RAM at any time. If the user wants to change the event sequence, a new event list may be written to an unused portion of the event RAM. The beginning address of the new event list can then be written to the corresponding block start register.

Figure 4A:
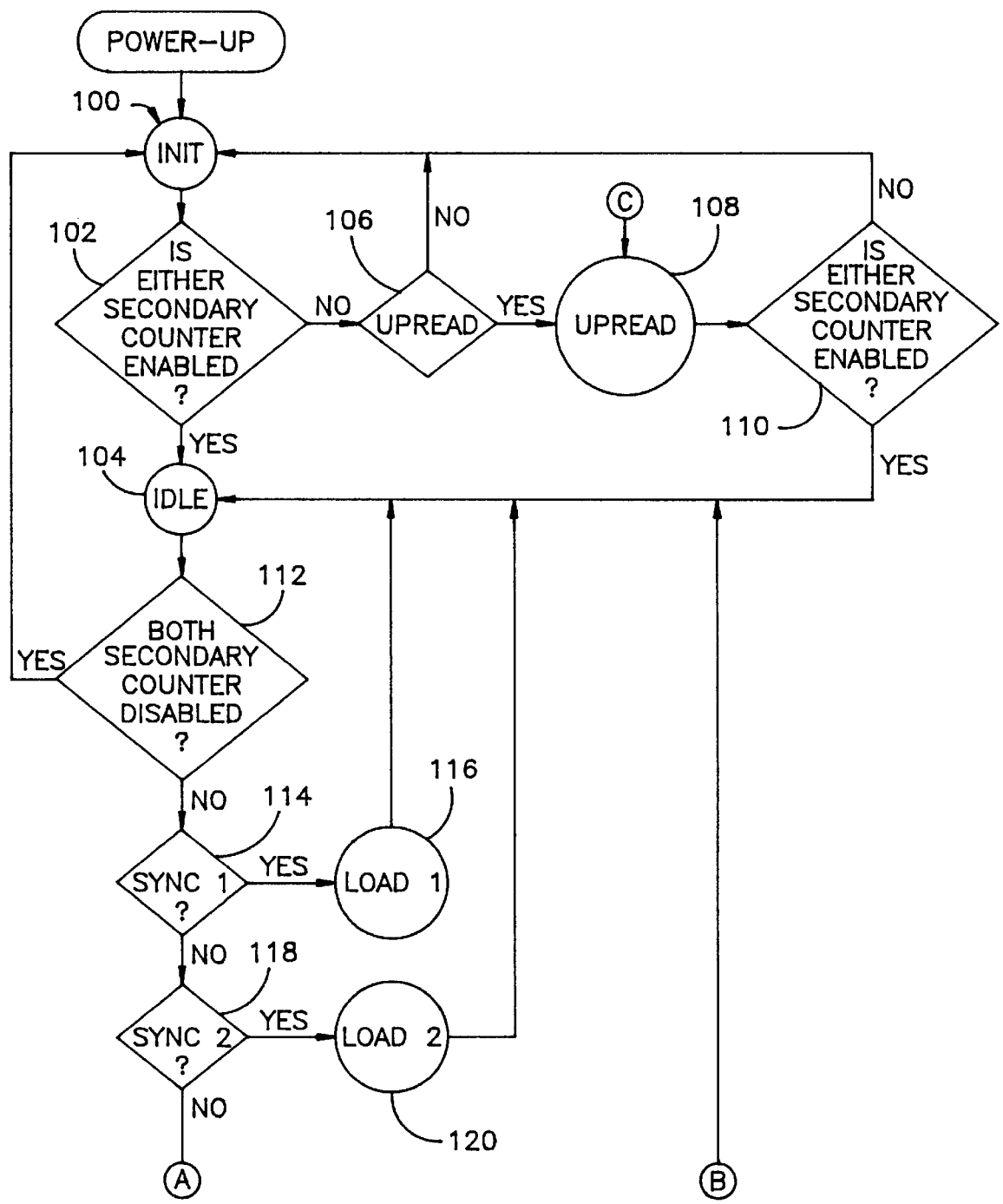
FIGS. 4A and 4B are state diagrams for the state machine that controls the timing generator.
Figure 4B:
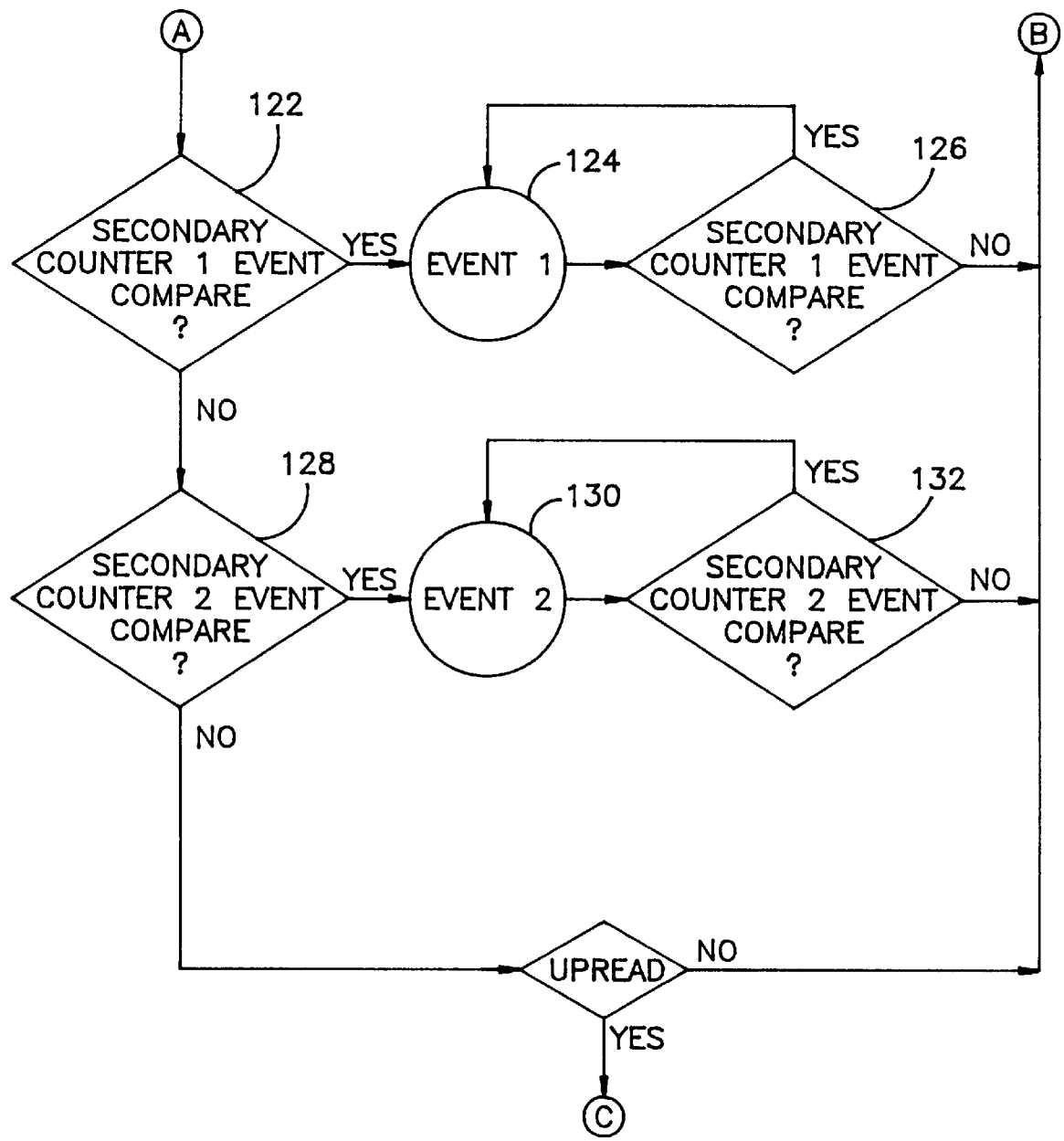

The timing generator 10 is controlled by the state machine 22. The operation of the state machine 22 is illustrated in FIGS. 4A and 4B. The state machine 22 enters an initialization state 100 when power is applied. During initialization, all timing and control outputs are disabled. Event lists are written and the timing of the mobile unit is synchronized, if necessary, with the base station frame timing. The user must decide whether one or both secondary counters are needed and then set the reset values in the appropriate sync register 34, 36. The state machine 22 then determines at 102 whether at least one secondary counter is enabled and if so, the timing generator 10 enters an idle state 104.

If neither secondary counter is enabled, the state machine 22 determines at 106 whether an upread request has been received from the microprocessor 20. An upread request is a request by the microprocessor 20 for access to the event memory. If not, the state machine 22 stays in the initialization state 100. If an upread request has been received, the state machine 22 enters the upread state 108 during which the microprocessor 20 reads from memory. When transitioning out of the upread state 108, the state machine 22 again determines at 110 whether either secondary counter 38, 40 is enabled. If not, the state machine 22 stays in the initialization state 100. If so, it transitions to the idle state 104.

In the idle state 104, the state machine 22 responds to five occurrences—a "frame sync" from the first synchronizing register 34, a "frame sync" from the second synchronizing register 36, a match signal from the secondary counter 38, and a match signal from the second secondary counter 40 and an upread request from the microprocessor 20. The state machine 22 checks for these occurrences in that order at 114, 118, 122, and 128, respectively. The state machine 22 also checks whether the secondary counters are disabled at 112 and, if so, transitions back to the initialization state 100.

If the "frame sync" signal is received from either synchronizing register 34, 36, the state machine 22 transitions to a load state 116, 120. In the load state, a pulse is generated by the state machine 22 and sent to the event table address control 60 which then loads the starting address into the corresponding pointer 62 as previously described. The event time and event action code for the next event are then loaded into their respective registers. The state machine 22 then returns back to the idle state 104.

If a "match signal" is received from either secondary counter 38, 40, the state machine 22 transitions to an event state 124, 130. In the event state 124, 130, the state machine 22 sends a pulse to the signal generator 52 causing the signal generator 52 to decode and execute the event action code stored in the decoder register of the signal generator 52. After execution of the event by the signal generator 52, the pointer 62 is incremented and the new event time and event action codes are loaded into their respective registers. After loading the new event, the state machine 22 determines at 126,132 whether a match signal is still present. This is possible because the clock rate of the state machine is faster than the clock rate of the secondary counters 38, 40. If the new event has the same event time as the previous event, the state machine 22 stays in the event state 124, 130. If not, the state machine 22 transitions back to the idle state 104.

If no "frame sync" or "match signal" occurs, the state machine 22 determines whether an upread signal has been received and if so, transitions to the upread state. If not, the state machine 22 stays in the idle state 104.

During operation, the events are read one at a time from the corresponding event list into the compare register 46, 48. The first event is read into the compare register when secondary counter 38, 40 is reset. The comparator 42, 44 compares the current event time in the compare register 46, 48 to the value of the secondary counter 38, 40. When the value of the secondary counter 38, 40 matches the value of the current event time, the 6-bit event action code is passed to the signal generator 52 and the event pointer is moved to the next address in the event RAM. The signal generator 52 decodes and executes the event action. The next event is then read from the event list into the compare register 46, 48. The timing generator 10 steps through all of the events in the event list until the "end of list" event is reached. The "end of list" event marks the last instruction in the event list. Once the "end of list" event is reached, no further update is made to the compare register until the secondary counter 38, 40 is reset.

The secondary counter resets when the primary counter value matches the reset value stored in the corresponding sync register 34, 36. When the secondary counter 38, 40 resets, the event pointer is moved back to the beginning address stored into the corresponding block start register. Thus, the event list is executed periodically at a predetermined interval when the timing generator is enabled.

The timing of the mobile station can be adjusted by changing the reset values stored in the sync register 34, 36. The microprocessor 20 reads the captured value of the primary counter stored in the primary counter capture register 56. Using this value and timing information received from the base station, the microprocessor 20 calculates the reset values needed to synchronize the mobile station with the base station and updates the reset values in the sync registers 34, 38 when adjustment is needed.

Table 1 below is an example of an event list for one of the secondary counters 36, 38.

The event list shown in Table 1 would cause the signal processor 52 to do the following:

TABLE 1

| Event Queue Address | Event Time (decimal) | Event Code | Event Instruction |
| --- | --- | --- | --- |
| start + 0 | 5 | 000011 | sig 0 high |
| start + 1 | 5 | 000010 | sig 0 low |
| start + 2 | 200 | 111111 | nop |
| start + 3 | 200 | 111111 | nop |
| start + 4 | 250 | 000101 | sig 1 high |
| start + 5 | 300 | 001001 | sig 3 high |
| start + 6 | 325 | 000100 | sig 1 low |
| start + 7 | 400 | 001000 | sig 3 low |
| start + 8 | 500 | 111011 | interrupt 1 |
| start + 9 | don't care | 000000 | last byte |

(1) strobe signal 0 at time 5;

(2) do nothing at time 200;

(3) set signal 1 high at time 250;

(4) set signal 2 high at time 300;

(5) set signal 1 low at time 325;

(6) set signal 3 low at time 400;

(7) generate an interrupt at time 500; and (8) restart at same sync from the sync register.

For a better understanding of how the timing generator handles overlapping timing events for two secondary counters, reference will be made to Tables 2 and 3 below. Table 2 shows an event list for secondary counter 1 while Table 3 shows an event list for secondary counter 2.

TABLE 2

| Secondary Counter 1 | |
| --- | --- |
| Time | Event |
| 10 | sig1 -> 1 |
| 20 | sig1 -> 0 |
| 40 | sig4 -> 1 |
| 40 | sig4 -> 0 |
| 60 | sig8 -> 1 |
| 60 | sig8 -> 0 |
| xxxxx | last event |

TABLE 3

Secondary Counter 2

| Time | Event |
|------|-------|
| 35 | sig10 −> 1 |
| 35 | sig10 −> 0 |
| 50 | sig12 −> 1 |
| 50 | sig12 −> 0 |
| 60 | sig15 −> 1 |
| 60 | sig15 −> 0 |
| 80 | sig16 −> 1 |
| 85 | sig16 −> 0 |
| xxxxx | last event |

The state machine of the timing generator will process the two lists in the following order:

| Time | Event | List |
|------|-------|------|
| 10 | sig1 −> 1 | Secondary Counter 1 |
| 10 | sig1 −> 0 | Secondary Counter 1 |
| 20 | sig4 −> 1 | Secondary Counter 1 |
| 35 | sig10 −> 1 | Secondary Counter 2 |
| 35 | sig10 −> 0 | Secondary Counter 2 |
| 40 | sig4 −> 0 | Secondary Counter 1 |
| 50 | sig12 −> 1 | Secondary Counter 2 |
| 50 | sig12 −> 0 | Secondary Counter 2 |
| 60 | sig8 −> 1 | Secondary Counter 1 |
| 60 | sig8 −> 0 | Secondary Counter 1 |
| 60 | lastevent1 | Secondary Counter 1 |
| 60 | sig15 −> 1 | Secondary Counter 2 |
| 60 | sig15 −> 0 | Secondary Counter 2 |
| 80 | sig16 −> 1 | Secondary Counter 2 |
| 85 | sig16 −> 0 | Secondary Counter 2 |
| 85 | lastevent2 | Secondary Counter 2 |

Several points should be noted about the execution of these event lists. First, while simultaneous events are not allowed (all instructions execute one at a time), multiple instructions may be executed for a single secondary counter value. This is possible because the rate at which these instructions are retrieved from the event RAM is controlled by a state clock signal which may be faster than the clock signal for the primary and secondary counters. If the state clock signal for the compare register toggles at a faster rate than the clock for the primary and secondary counters, then multiple instructions may be executed for every secondary counter value. Secondly, when both event lists contain instructions having the same secondary counter value, then the instruction for secondary counter 1 is executed before the instruction for secondary counter 2.

By using a RAM to store an event list, all but one set of comparator logic per secondary counter is eliminated. This reduces both power and gate count significantly as compared to prior art timing generators. The present invention also provides greater flexibility than prior art timing generators. The event list can be readily modified or multiple event lists can be created for each secondary counter. The skip control and disable group event allow execution of the event list to be stopped under predetermined conditions.

What is claimed is:

1. A signal generating apparatus for generating a sequence of timing signals that are repeated at periodic intervals, comprising:
   a) a random access memory for storing an event list comprising one or more events, wherein each event including an event time and an associated event action code, wherein said event action codes define the timing signals to be generated;
   b) a counter incremented at a predetermined clock rate;
   c) a comparator for comparing said event times to the value of said counter and for generating a match signal when the event time for an event matches said counter value; and
   d) a signal generator responsive to said match signal from said comparator for decoding and executing the event action code corresponding to the matching event time to generate a timing signal.

2. The signal generating apparatus of claim 1 further comprising a compare register to store said event time while said event time is being compared to the value of said counter.

3. The signal generating apparatus of claim 1 wherein said events are stored in consecutive addresses in said random access memory and are compared to said counter value in the order said events are stored.

4. The signal generating apparatus of claim 3 further including a pointer to indicate the address of the next event to be executed, wherein said pointer is incremented after the execution of each event.

5. The signal generating apparatus of claim 4 further including a start register for holding the starting address of the event list, wherein said pointer is initially set to said starting address.

6. The signal generating apparatus of claim 5 further comprising a plurality of event lists stored in said random access memory, wherein said event lists can be changed by changing the starting address in said start register to indicate the starting address of the event list to be executed.

7. The signal generating apparatus of claim 1 wherein said event list includes a "last event" code to indicate the last event in the event list.

8. The signal generating apparatus of claim 1 wherein said events in said event list include a "disable group" event which when executed disables the executive of the event list.

9. The signal generating apparatus of claim 1 further including reset means for resetting said counter periodically, wherein each periodic interval constitutes a frame.

10. The signal generating apparatus of claim 9 wherein said reset means generates a frame boundary signal at the end of each frame.

11. The signal generating apparatus of claim 10 further comprising a skip control to disable the execution of the event list for a predetermined number of frames.

12. The signal generating apparatus of claim 1 further comprising a capture register to capture the value of said counter.

13. The signal generating apparatus of claim 1 further comprising a counter length register to store the terminal value of said counter, wherein said counter resets when said terminal value stored in said counter length register is reached.

14. The signal generating apparatus according to claim 1 further comprising a second counter incremented at said predetermined clock rate and a second comparator for comparing said event times to the value of said second counter, said signal generator being responsive to a match signal from said second counter to decode and execute the event action code corresponding to the event time matching the value of the second counter to generate a timing signal.

15. The signal generating apparatus of claim 14 further including two separate event lists stored in said random access memory, wherein the event time for the events in each event list is compared to a selected one of said counters.

16. The signal generating apparatus of claim 15 further including reset means for independently resetting each of said counters.

17. A signal generating apparatus comprising:
a) a random access memory for storing an event list comprising one or more events, each event including an event time and an associated event action code, wherein said event action codes define the timing signals to be generated;
b) a primary counter incremented at a predetermined clock rate;
c) a secondary counter incremented at said predetermined clock rate;
d) a synchronizing register for storing a reset value and for resetting said secondary counter when the value of said primary counter matches said reset value stored in said synchronizing register;
e) a comparator for comparing the value of said event times to said secondary counter and for generating a match signal when the event time for an event matches the value of said secondary counter; and
f) a signal generator responsive to said match signal from said comparator for decoding and executing said event action code corresponding to the matching event time to generate a timing signal.

18. The signal generating apparatus of claim 17 further comprising a compare register to store said event time while said event time is being compared to the value of said secondary counter.

19. The signal generating apparatus of claim 17 wherein said events are stored in consecutive addresses in said random access memory and are compared to the value of said secondary counter in the order said events are stored.

20. The signal generating apparatus of claim 19 further including a pointer to indicate the address of the next event to be executed, wherein said pointer is incremented after the execution of each event.

21. The signal generating apparatus of claim 20 further including a start register for storing the starting address of the event list, wherein said pointer is initially set to said starting address.

22. The signal generating apparatus of claim 21 further comprising a plurality of event lists stored in said random access memory, wherein said event lists can be changed by changing the starting address in said start register to indicate the starting address of the event list to be executed.

23. The signal generating apparatus of claim 17 wherein said event list includes a "last event" code to indicate the last event in the event list.

24. The signal generating apparatus of claim 17 wherein said events in said event list include a "disable group" event which when executed disables the executive of the event list.

25. The signal generating apparatus according to claim 17 further comprising a second secondary counter incremented at said predetermined clock rate and a second comparator for comparing said event times to the value of said second secondary counter, said signal generator being responsive to a match signal from said second secondary counter to decode and execute the event action code corresponding to the event time matching the value of the second secondary counter to generate a timing signal.

26. The signal generating apparatus of claim 25 further including two separate event lists stored in said random access memory, wherein the event time for the events in each event list is compared to a selected one of said secondary counters.

27. The signal generating apparatus of claim 26 further including reset means for independently resetting each of said counters.

28. A method for generating timing signals in a mobile radio communication device synchronously with the time frame of a base station comprising:
a) storing in a random access memory an event list including a plurality of events, each event including an event time and an associated event action code, said event action codes defining the timing signals to be generated;
b) incrementing a first counter at a predetermined clock rate;
c) comparing said event times to the value of said counter; and
d) decoding and executing an event action code when its associated event time matches the value of said counter.

29. The method according to claim 28 further comprising the step of storing the events in consecutive addresses of said random access memory and comparing said event times to said counter value in the order in which the events are stored.

30. The method according to claim 29 further comprising storing an address of the next event to be executed in a pointer and incrementing said pointer to the next consecutive address after the execution of each event.

31. The method according to claim 30 further comprising the step of storing a starting address for the event list in a start register, said pointer being set initially to said starting address.

32. The method according to claim 31 further comprising storing multiple event lists in said random access memory and selecting the event list to be executed by storing its starting address in said start register.

33. The method according to claim 28 further including storing a "last event" code in said event list to make the end of the event list.

34. The method according to claim 28 further including storing a "disabled group" code in said event list and disabling execution of the event list after said disable group event is executed.

35. The method according to claim 28 further comprising the step of storing the event time of each event in a compare register while it is compared to said counter value, and updating said compare register after the execution of each event.

36. The method according to claim 28 further comprising the step of stopping execution of the event list for a predetermined number of frames, and restarting execution of said event list when said predetermined number of frames has been completed.

37. The method of claim 28 further including the steps of incrementing a second counter, comparing said event times to the value of said second counter, and decoding and executing an event action code when its associated event time matches said second counter value.

38. The method according to claim 37 further including the steps of storing first and second event lists in said random access memory, comparing the event times for events in said first event list to the value of said first counter, and comparing the event times for events in said second event list to the value of said second counter.

* * * * *